United States Patent [19]

Wu

[11] Patent Number: 5,884,101
[45] Date of Patent: Mar. 16, 1999

[54] APPARATUS FOR DETECTING DATA BUFFER FAULTS

[75] Inventor: Chun-Chu Archie Wu, San Carlos, Calif.

[73] Assignee: I-Cube, Inc., Campbell, Calif.

[21] Appl. No.: 62,247

[22] Filed: Apr. 17, 1998

[51] Int. Cl.[6] .................................................. G06F 11/00
[52] U.S. Cl. .......................... 395/877; 395/872; 395/873; 395/876; 395/184.01; 395/185.01; 395/185.02; 395/185.03; 395/185.04; 371/21.2; 371/24; 711/110
[58] Field of Search ......................... 395/184.01, 185.01, 395/872, 876, 877; 371/21.2, 24; 711/100

[56] References Cited

U.S. PATENT DOCUMENTS

| | | | |
|---|---|---|---|
| 4,258,418 | 3/1981 | Heath ...................................... | 395/873 |
| 4,692,893 | 9/1987 | Casper .................................... | 395/875 |
| 4,803,654 | 2/1989 | Rasberry et al. ....................... | 711/110 |
| 4,835,774 | 5/1989 | Ooshima et al. ...................... | 371/21.2 |
| 5,471,488 | 11/1995 | Bender ................................. | 395/185.08 |
| 5,633,878 | 5/1997 | Ernkell et al. ............................ | 371/24 |

OTHER PUBLICATIONS

Access I/O Products, Inc., WDG–CSM Watchdog and Computer System Monitor Card, published at http://www.acces–usa.com/wdgcsm.html, 1997, 3 pages.

OutSource Engineering & Manufacturing, Watchdog Cards . . . Product Descriptions and Prices, published at http://www.indim.com/~outsrc/watchdogs.html, 1997, 3 pages.

*Primary Examiner*—Daniel H. Pan
*Assistant Examiner*—Nabil El-Hady
*Attorney, Agent, or Firm*—Smith-Hill and Bedell

[57] ABSTRACT

A buffer monitor includes a first counter for counting bits of incoming data as they arrive at a data buffer that stores and then forwards the incoming data. Each bit of outgoing data resets the first counter's count. If its count reaches a first limit before being reset by an outgoing data bit, the first counter asserts an alarm. The buffer monitor also includes a second counter for counting bits of outgoing data as they depart the buffer. Each bit of incoming data resets the second counter's count. If its count reaches a second limit level before being reset by an incoming data bit, the second counter asserts an alarm. The first counter will sound an alarm when the buffer fails to forward output data after having received a substantial amount of input data. The second counter will assert an alarm when the buffer has forwarded a substantial amount of output data without having received any input data. Neither counter will assert an alarm when the buffer stops forwarding data simply because it hasn't received any data to forward.

4 Claims, 1 Drawing Sheet

APPARATUS FOR DETECTING DATA BUFFER FAULTS

BACKGROUND OF THE INVENTION

1. Field of the Invention

The present invention relates in general to data buffers and in particular to a method and apparatus for monitoring a data buffer and producing an alarm signal when the data buffer fails to operate properly.

2. Description of Related Art

Data buffers are employed in a wide variety of applications to temporarily store data. For example, when computers are interconnected to form a network they send data to one other via network buses. But since the various buses forming a network can have varying data transfer rates or different data transfer protocols, they cannot be directly linked to one another. However a data buffer linking two buses can receive and store data arriving on one bus using one data transfer rate and protocol and then later forward the data outward on another bus using another data transfer rate and protocol.

A network routing switch at the junction of several network buses may employ a data buffer at each of its input ports and each of its output ports. In such a switch input and output port buffers may share a common buffer memory in order to maximize the efficiency of memory use. Buffer memory space is usually organized into a set of uniformly sized "buffer cells" and data arriving on any bus can be stored in any set of unoccupied buffer cells. In such a buffer system, the sequence of data passing through a buffer at any hub or switch port may not be stored in a sequential set of buffer cells. Thus a typical buffer memory manager uses a "linked list" to keep track of the set of buffer cells that store the data for each port. Each successive entry of the linked list includes a pointer to a buffer cell containing successively received data. Each list entry also includes a pointer referencing the next entry of the list. When the buffer manager writes incoming data into a buffer cell it adds an entry pointing to the cell to the end of the linked list. Each time the buffer manager forwards data out of a buffer memory cell it reads the next entry pointer in the entry pointing to that cell to locate the list entry for the next data to be forwarded. The linked list for each buffered port may also be stored in a dedicated area of the buffer memory and the buffer manager keeps track of the addresses of the first and last entries of each list.

Buffer faults arise when the buffer manager fails to properly maintain the linked list. A buffer can have a "broken chain" fault when the next entry pointer within an entry other than the last entry of the list fails to point to another entry. Once the buffer manager has forwarded data from a buffer cell referenced by the entry with the faulty next entry pointer, the buffer manager cannot forward any more data out of the buffer memory because it can't find the next list entry. A buffer can have an "endless loop" fault when the next entry pointer of one list entry erroneously points to an earlier entry on the list. In such case the buffer manager will forward the same set of data out of memory until the faulty entry is overwritten.

What is needed is a means for monitoring a network buffer to determine when it has had a failure and for signaling an alarm when a failure has occurred. The alarm signal can be used, for example, to notify a system manager or to reset the buffer. Although in resetting a buffer all of the data stored in the buffer memory will be lost, any linked list errors will be eliminated because the linked lists will be discarded.

Prior art network buffers have employed "watchdog timers" to monitor buffer activity and signal when faults occur. Once such watchdog timer is the Access I/O Products Inc. model WDG-CSM Watchdog and Computer System Monitor Card illustrated in on Internet page address http://www.access-usa.com/wdgcsm.html published by Access I/O Products on Oct. 31, 1997. Another Internet page address http:www.indim.com/-outsrc/index.html published Oct. 31, 1997 by OutSource Engineering & Manufacturing describes a similar watchdog timer.

FIG. 1 illustrates a prior art use of a watchdog timer 2 for monitoring a network buffer 8. Buffer 8 receives and stores data arriving on a input bus (DATA_IN) and forwards that data on an output bus (DATA_OUT). Watchdog timer 2 includes a resettable counter 4 and a clock signal generator 6. Counter 4 counts pulses of a CLOCK signal produced by clock signal generator 6. Counter 4 may either count up from 0 to a level indicated by input LIMIT or down from the LIMIT level to 0. At any time the count may be reset to its starting point by a pulse in a signal applied to a RESET input of counter 4. If its count reaches its endpoint before it is reset, counter 4 produces an output ALARM signal.

The output terminal of a network buffer 8 is connected to the RESET input of counter 4 through a data detector 9. Data detector 9 monitors the buffer's output bus and pulses the RESET input whenever data is forwarded outward from buffer 8 on that bus. Thus counter 4 is reset whenever buffer 8 forwards data. Accordingly counter 4 will assert the ALARM signal whenever buffer 8 fails to produce output data for a period of time equal to the product of the CLOCK signal period and a number of CLOCK signal cycles referenced by the LIMIT data. Watchdog timer 2 will detect a break in a linked list or any other error that prevents buffer 8 from forwarding any data for a given amount of time. However watchdog timer 2 will not detect an endless loop fault that causes buffer 8 to endlessly forward the same set of stored data. Also watchdog timer 2 will incorrectly assert the ALARM signal when the output data traffic of buffer 8 ceases simply because its input data traffic ceases.

What is needed is an apparatus for monitoring a buffer memory and signaling an alarm whenever the buffer fails and which avoids signaling an alarm when the buffer does has not failed.

SUMMARY OF THE INVENTION

The present invention relates to an apparatus for monitoring a data buffer of the type which receives and stores data arriving on an input bus and later forwards that data on an output bus.

In accordance with one aspect of the invention, the buffer monitor includes a first counter for counting data arriving at a buffer on the first bus and asserting a first alarm signal if the count reaches a first limit. However its count is reset to its starting point whenever the buffer forwards data on its output bus. Thus the first counter only asserts the first alarm signal if its count reaches the first limit before being reset by data forwarding activity on the buffer's output bus.

In accordance with another aspect of the invention, the buffer monitor also includes a second counter for counting data departing the buffer on the second bus and asserting a second alarm signal if its count reaches a second limit. However its count is reset to its starting point whenever the buffer receives data on its input bus. Thus the second counter only asserts the second alarm signal if its count reaches the second limit before being reset by data arriving on the buffer's input bus.

Thus the first counter asserts the first alarm signal when the buffer fails to forward output data after having received a substantial amount of input data. The second counter asserts the second alarm signal when the buffer has forwarded a substantial amount of output data without having received any input data. The first and second alarm signals may be logically combined to form a third alarm signal that will indicate both broken chain and endless loop buffer faults. Neither counter will assert an alarm signal when the buffer stops forwarding data simply because it hasn't received any data to forward.

It is accordingly an object of the invention to provide a buffer monitor that alarms for both broken chain and endless loop buffer faults but which does not alarm when the buffer fails to forward data for a while because it is empty.

The concluding portion of this specification particularly points out and distinctly claims the subject matter of the present invention. However those skilled in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWING(S)

FIG. 1 illustrates in block diagram form a prior art watchdog timer for monitoring a data buffer; and FIG. 2 illustrates in block diagram form a buffer monitor in accordance with the present invention.

DESCRIPTION OF THE PREFERRED EMBODIMENT(S)

Figure 1:
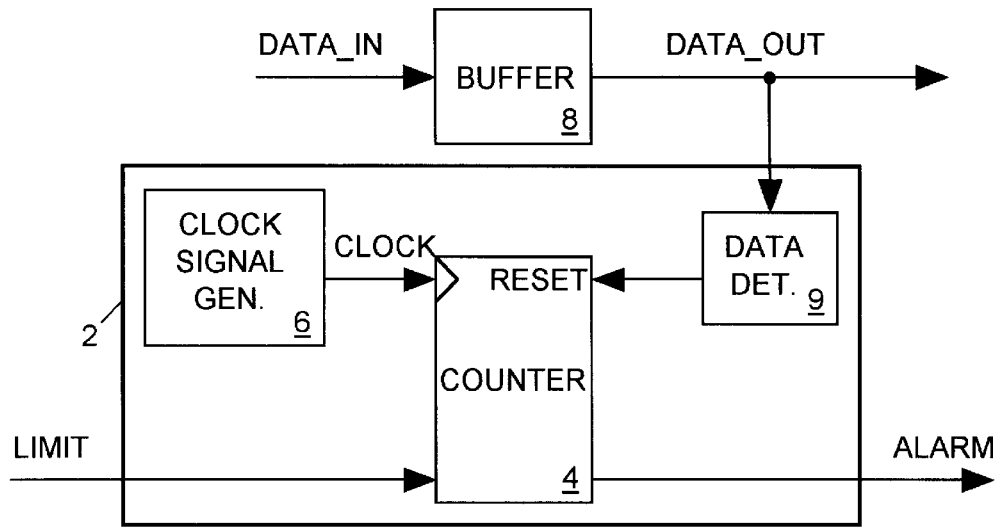
Figure 2:
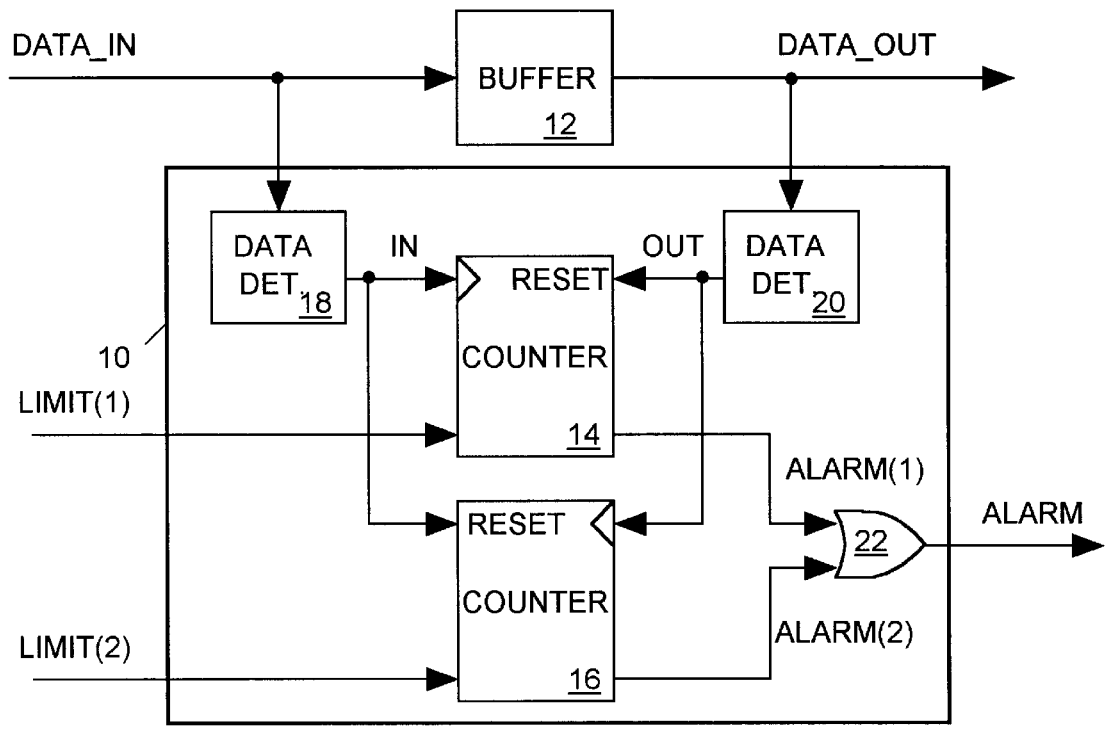

FIG. 2 illustrates a buffer monitor 10 in accordance with the present invention for monitoring a data buffer 12 and asserting an output signal (ALARM) when the data buffer 12 fails to operate properly. Buffer 12 receives and stores incoming data arriving on an input bus (DATA_IN) until it can be forwarded outward on an output bus (DATA_OUT). The ALARM signal may be used, for example, to initiate a reset of buffer 12 operation or to notify a system manager of a buffer failure.

Buffer monitor 10 includes a pair of counters 14 and 16 and pair of data detectors 18 and 20. Data detector 18 monitors the DATA_IN bus supplying digital input data to buffer 12 and pulses a signal (IN) whenever input data is delivered to buffer 12. Similarly data detector 20 monitors the DATA_OUT bus conveying output data away from buffer 12 and pulses a signal (OUT) whenever output data departs buffer 12.

The IN signal is applied to a clock input of counter 14 and to a reset input of counter 16. The OUT signal is applied to a RESET input of counter 14 and to a clock input of counter 16. Counter 14 counts pulses of the IN signal down to 0 from a first number represented by input data LIMIT(1) and asserts an output ALARM(1) signal when the count reaches 0. However counter 14 resets its count to the number represented by LIMIT(1) in response to each pulse of the OUT signal. Thus counter 14 only asserts its output ALARM (1) signal if buffer 12 has received and stored a large amount of input data without having produced any output data. The value of the LIMIT(1) data determines the amount of input data that triggers the alarm.

Counter 16 counts pulses of the OUT signal down to 0 from a second number represented by input data LIMIT(2) and asserts an output ALARM(2) signal when its count reaches 0. However counter 16 resets its count to the number represented by the LIMIT(2) data in response to each pulse of the IN signal. Thus counter 16 only asserts its output ALARM(2) signal if buffer 12 has transmitted a sufficient amount output data without having received any input data. The value of the LIMIT(2) data determines the amount of output data that triggers the alarm.

An OR gate 22 logically combines the ALARM(1) and ALARM(2) signal to produce the output ALARM signal that will indicate both broken chain and endless loop buffer faults but will not indicate a fault when buffer 12 stops forwarding data simply because it hasn't received any input data to forward.

While the forgoing specification has described preferred embodiment(s) of the present invention, one skilled in the art may make many modifications to the preferred embodiment without departing from the invention in its broader aspects. For example buffer monitor 10 is suitable for monitoring buffers employing a variety of types of input and output buses provided that the nature of data detectors 18 and 20 are suitable for detecting data transfer on the buffer's input and output buses. All data bus standards specify some type of synchronous or asynchronous protocol to indicate when data is being transferred on a bus and therefore circuits that communicate via a bus typically include some sort of data detector to determine when data is being transferred on the bus. Such data detectors are well-known to those skilled in the art and are not detailed herein. Also while described herein above as "count down" type counters, counters 14 and 16 may be of the type which alarms after counting up from 0 to the value indicated by LIMIT(1) or LIMIT(2) unless the count is reset to 0. The appended claims therefore are intended to cover all such modifications as fall within the true scope and spirit of the invention.

What is claimed is:

1. An apparatus for monitoring a data buffer of the type which receives and stores data arriving on an input bus and later forwards that data on an output bus, the apparatus comprising:

means (18) connected to said input bus for pulsing a first indicating signal (IN) when data arrives at said buffer on said input bus, means (20) connected to said output bus for pulsing a second indicating signal (OUT) when data departs said buffer on said output bus, and first means (14) for receiving said first and second indicating signals, for maintaining a first count of pulses of said first indicating signal, for resetting said first count to a first starting level in response to each pulse of said second indicating signal, and for asserting an output first alarm signal when said first count reaches a first limit.

2. The apparatus in accordance with claim 1 further comprising:

second means (16) for receiving said first and second indicating signals, for maintaining a second count of pulses of said second indicating signal, for resetting said second count to a second starting level in response to each pulse of said first indicating signal, and for asserting an output second alarm signal when said second count reaches a second limit.

3. The apparatus in accordance with claim 2 further comprising means (22) for logically combining said first and second alarm signals to produce a third alarm signal.

4. An apparatus for monitoring a data buffer of the type which receives and stores data arriving on an input bus and later forwards that data on an output bus, the apparatus comprising:

means (20) connected to said output bus for pulsing a first indicating signal (OUT) when data departs said buffer on said output bus, and means (18) connected to said input bus for pulsing a second indicating signal (IN) when data arrives at said buffer on said input bus, first means (16) for receiving said first and second indicating signals, for maintaining a count of pulses of said first indicating signal, for resetting said count to a starting level in response to each pulse of said second indicating signal, and for asserting an output alarm signal when said count reaches a predetermined limit.

\* \* \* \* \*